United States Patent
Slegel et al.

(10) Patent No.: US 10,838,631 B2
(45) Date of Patent: Nov. 17, 2020

(54) DETECTION OF ALTERATION OF STORAGE KEYS USED TO PROTECT MEMORY

(71) Applicant: INTERNATIONAL BUSINESS MACHINES CORPORATION, Armonk, NY (US)

(72) Inventors: Timothy Slegel, Staatsburg, NY (US); Jonathan D. Bradbury, Poughkeepsie, NY (US); Bruce C. Giamei, Lagrangeville, NY (US); James H. Mulder, Wappingers Falls, NY (US); Peter J. Relson, Ulster Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/283,989

(22) Filed: Feb. 25, 2019

(65) Prior Publication Data
US 2020/0272341 A1    Aug. 27, 2020

(51) Int. Cl.
*G06F 3/06* (2006.01)
(52) U.S. Cl.
CPC .......... *G06F 3/0622* (2013.01); *G06F 3/0637* (2013.01); *G06F 3/0673* (2013.01)
(58) Field of Classification Search
CPC ..... G06F 3/0622; G06F 3/0637; G06F 3/0673
See application file for complete search history.

(56) References Cited

U.S. PATENT DOCUMENTS

| | | |
|---|---|---|
| 5,608,866 A | 3/1997 | Horikawa |
| 6,539,500 B1 | 3/2003 | Kahle et al. |
| 7,103,877 B1 | 9/2006 | Arnold et al. |
| 8,645,644 B2 | 2/2014 | Guthrie et al. |
| 9,311,259 B2 | 4/2016 | Greiner et al. |
| 9,442,824 B2 | 9/2016 | Gainey, Jr. et al. |
| 2009/0187771 A1 | 7/2009 | McLellan, Jr. |
| 2013/0007365 A1* | 1/2013 | Varone ................ G06F 3/0622 711/115 |

(Continued)

FOREIGN PATENT DOCUMENTS

CN 107408081 A 11/2017

OTHER PUBLICATIONS

Bruetsch, BJ, "Hardware Assist for Program Event Recording," IP.com No. IPCOM000059699D, Jan. 1986, pp. 1-2 (+ cover).

(Continued)

*Primary Examiner* — Aracelis Ruiz
(74) *Attorney, Agent, or Firm* — Blanche E. Schiller, Esq.; Steven Chiu, Esq.; Heslin Rothenberg Farley & Mesiti P.C.

(57) ABSTRACT

Detection of alteration of storage keys used to protect memory includes determining whether a storage key alteration event has occurred within a processor of a computing environment. The determining includes checking whether one or more selected fields of a storage key have been updated. The storage key is associated with a block of memory and controls access to the block of memory. Based on the checking indicating that the one or more selected fields of the storage key have been updated, a storage key alteration event has been detected. Based on determining the storage key alteration event has occurred, a notification is provided.

20 Claims, 10 Drawing Sheets

(56) References Cited

U.S. PATENT DOCUMENTS

| | | | |
|---|---|---|---|
| 2013/0174224 A1* | 7/2013 | Ueki | G06F 12/1458 726/4 |
| 2017/0060782 A1* | 3/2017 | Chinnakkonda Vidyapoornachary | G06F 3/0622 |
| 2018/0018279 A1 | 1/2018 | Bradbury | |
| 2018/0039581 A1* | 2/2018 | Hung | G06F 3/0659 |

OTHER PUBLICATIONS

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

DETERMINE WHETHER A STORAGE KEY ALTERATION EVENT HAS OCCURRED WITHIN A PROCESSOR OF A COMPUTING ENVIRONMENT — 600

THE DETERMINING INCLUDING CHECKING WHETHER ONE OR MORE SELECTED FIELDS OF A STORAGE KEY HAVE BEEN UPDATED — 602

THE STORAGE KEY IS ASSOCIATED WITH A BLOCK OF MEMORY AND CONTROLS ACCESS TO THE BLOCK OF MEMORY — 604

THE STORAGE KEY ALTERATION EVENT HAS OCCURRED BASED ON THE CHECKING INDICATING THAT THE ONE OR MORE SELECTED FIELDS OF THE STORAGE KEY HAVE BEEN UPDATED — 606

PROVIDE NOTIFICATION OF THE STORAGE KEY ALTERATION EVENT BASED ON DETERMINING THE STORAGE KEY ALTERATION EVENT HAS OCCURRED — 608

NOTIFICATION OF THE STORAGE KEY ALTERATION EVENT IS VIA AN INTERRUPT — 609

THE CHECKING INCLUDES CHECKING WHETHER ONE OR MORE SELECTED FIELDS OF THE STORAGE KEY HAVE BEEN UPDATED WITHOUT AN ACCESS EXCEPTION — 610

THE STORAGE KEY ALTERATION EVENT HAS OCCURRED BASED ON THE CHECKING INDICATING THAT THE ONE OR MORE SELECTED FIELDS OF THE STORAGE KEY HAVE BEEN UPDATED WITHOUT AN ACCESS EXCEPTION — 612

THE DETERMINING WHETHER THE STORAGE KEY ALTERATION EVENT HAS OCCURRED FURTHER INCLUDES DETERMINING WHETHER THE BLOCK OF MEMORY IS WITHIN A DESIGNATED STORAGE AREA — 614

THE STORAGE KEY ALTERATION EVENT HAS OCCURRED BASED ON THE CHECKING INDICATING THAT THE ONE OR MORE SELECTED FIELDS OF THE STORAGE KEY HAVE BEEN UPDATED AND THE BLOCK OF MEMORY IS WITHIN THE DESIGNATED STORAGE AREA — 616

FIG. 6A

THE CHECKING INCLUDES CHECKING WHETHER ONE OR MORE SELECTED FIELDS OF THE STORAGE KEY HAVE BEEN UPDATED WITHOUT AN ACCESS EXCEPTION ~620

THE STORAGE KEY ALTERATION EVENT HAS OCCURRED BASED ON THE CHECKING INDICATING THAT THE ONE OR MORE SELECTED FIELDS OF THE STORAGE KEY HAVE BEEN UPDATED WITHOUT AN ACCESS EXCEPTION AND THAT THE BLOCK OF MEMORY IS WITHIN THE DESIGNATED STORAGE AREA ~622

THE DESIGNATED STORAGE AREA IS DEFINED BY A STARTING ADDRESS OF MEMORY DESIGNATED IN A FIRST LOCATION AND AN ENDING ADDRESS OF MEMORY DESIGNATED IN A SECOND LOCATION ~624

THE FIRST LOCATION IS A SELECTED CONTROL REGISTER AND THE SECOND LOCATION IS ANOTHER SELECTED CONTROL REGISTER ~626

THE ENDING ADDRESS WRAPS AROUND TO THE STARTING ADDRESS, AND A SELECTED NUMBER OF LOW ORDER BITS FOR THE STARTING ADDRESS AND FOR THE ENDING ADDRESS ARE USED IN THE DEFINITION OF THE DESIGNATED STORAGE AREA TO INCLUDE MORE THAN A SINGLE BLOCK OF MEMORY ~628

THE DETERMINING WHETHER THE BLOCK OF MEMORY IS WITHIN THE DESIGNATED STORAGE AREA INCLUDES DETERMINING WHETHER ONE OR MORE UNITS OF MEMORY OF THE BLOCK OF MEMORY LIE WITHIN THE DESIGNATED STORAGE AREA ~630

THE ONE OR MORE SELECTED FIELDS INCLUDE AN ACCESS-CONTROL FIELD OF THE STORAGE KEY ~632

THE ONE OR MORE SELECTED FIELDS INCLUDE A FETCH-PROTECTION FIELD OF THE STORAGE KEY ~634

FIG. 6B

DETECTION OF ALTERATION OF STORAGE KEYS USED TO PROTECT MEMORY

BACKGROUND

One or more aspects relate, in general, to facilitating processing within a computing environment, and in particular, to facilitating processing associated with protecting access to memory.

In the z/Architecture hardware architecture, offered by International Business Machines Corporation, Armonk, N.Y., a storage key is used to control access to memory. For instance, each block of memory has a storage key associated therewith that controls access to that block of memory. The storage key includes a plurality of fields, which may be set or changed by various instructions executed by a program. Certain of the fields are set or changed via instructions executed by a privileged program, such as an operating system or other privileged program.

By convention, only specific programs are expected to change storage keys. When other programs change a storage key, that can have adverse consequences. Also, if a program issuing an instruction to change the storage key has a programming error, the storage key may be changed incorrectly and become corrupted.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. The method includes determining whether a storage key alteration event has occurred within a processor of the computing environment. The determining includes checking whether one or more selected fields of a storage key have been updated. The storage key is associated with a block of memory and controls access to the block of memory. The storage key alteration event has occurred based on the checking indicating that the one or more selected fields of the storage key have been updated. Based on determining the storage key alteration event has occurred, notification of the storage key alteration event is provided.

By detecting alteration of the storage key, a program can determine whether the storage key has been corrupted and perform actions to, for instance, identify an incorrect program changing the storage key and/or a program incorrectly changing the storage key. Security within the processor is improved, as well as performance.

As one example, the providing notification includes providing notification of the storage key alteration event via an interrupt, based on determining the storage key alteration event has occurred.

In one example, the checking includes checking whether one or more selected fields of the storage key have been updated without an access exception. Based on the checking indicating that the one or more selected fields of the storage key have been updated without an access exception, the storage key alteration event has occurred.

In one example, the determining whether the storage key alteration event has occurred further includes determining whether the block of memory is within a designated storage area. Based on the checking indicating that the one or more selected fields of the storage key have been updated and the block of memory is within the designated storage area, the storage key alteration event has occurred.

Further, in one example, the checking includes checking whether one or more selected fields of the storage key have been updated without an access exception, and the storage key alteration event has occurred based on the checking indicating that the one or more selected fields of the storage key have been updated without an access exception and that the block of memory is within the designated storage area.

As an example, the designated storage area is defined by a starting address of memory designated in a first location and an ending address of memory designated in a second location. The first location is, for instance, a selected control register and the second location is another selected control register.

In one example, the ending address wraps around to the starting address, and a selected number of low order bits for the starting address and for the ending address are used in the definition of the designated storage area to include more than a single block of memory.

Further, in one example, the determining whether the block of memory is within the designated storage area includes determining whether one or more units of memory of the block of memory lie within the designated storage area.

As examples, the one or more selected fields include an access-control field of the storage key and/or a fetch-protection field of the storage key.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 6A-6B depict one example of facilitating processing within a computing environment, in accordance with an aspect of the present invention;

DETAILED DESCRIPTION

In accordance with an aspect of the present invention, a capability is provided to facilitate processing within a computing environment. For instance, a capability is provided to detect that a storage key used to protect a block of memory of the computing environment has been altered. The capability includes, for instance, a program event recording (PER) event interrupt that indicates that the storage key has been altered. By detecting alteration of the storage key, a program can determine whether the storage key has been corrupted and perform actions to, for instance, identify an incorrect program changing the storage key and/or a program incorrectly changing the storage key. As one example, the block of memory (also referred to herein as storage) is a page of memory, which is, for instance, 4K-bytes of memory. In other examples, the block of memory may be other than a page of memory and/or the page of memory may be other than 4K-bytes. Many variations are possible.

Figure 1A:
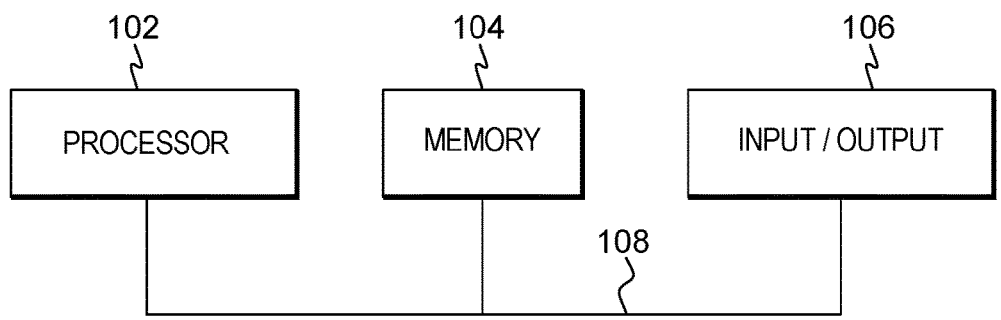
FIG. 1A depicts one example of a computing environment to incorporate and use one or more aspects of the present invention.

One embodiment of a computing environment to incorporate and use one or more aspects of the present invention is described with reference to FIG. 1A. A computing environment 100 includes, for instance, a processor 102 (e.g., a central processing unit), a memory 104 (e.g., main memory; a.k.a., system memory, main storage, central storage, storage), and one or more input/output (I/O) devices and/or interfaces 106 coupled to one another via, for example, one or more buses 108 and/or other connections.

In one example, processor 102 is based on the z/Architecture hardware architecture, and is part of a server, such as an IBM Z° server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, 12$^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system.

Figure 1B:
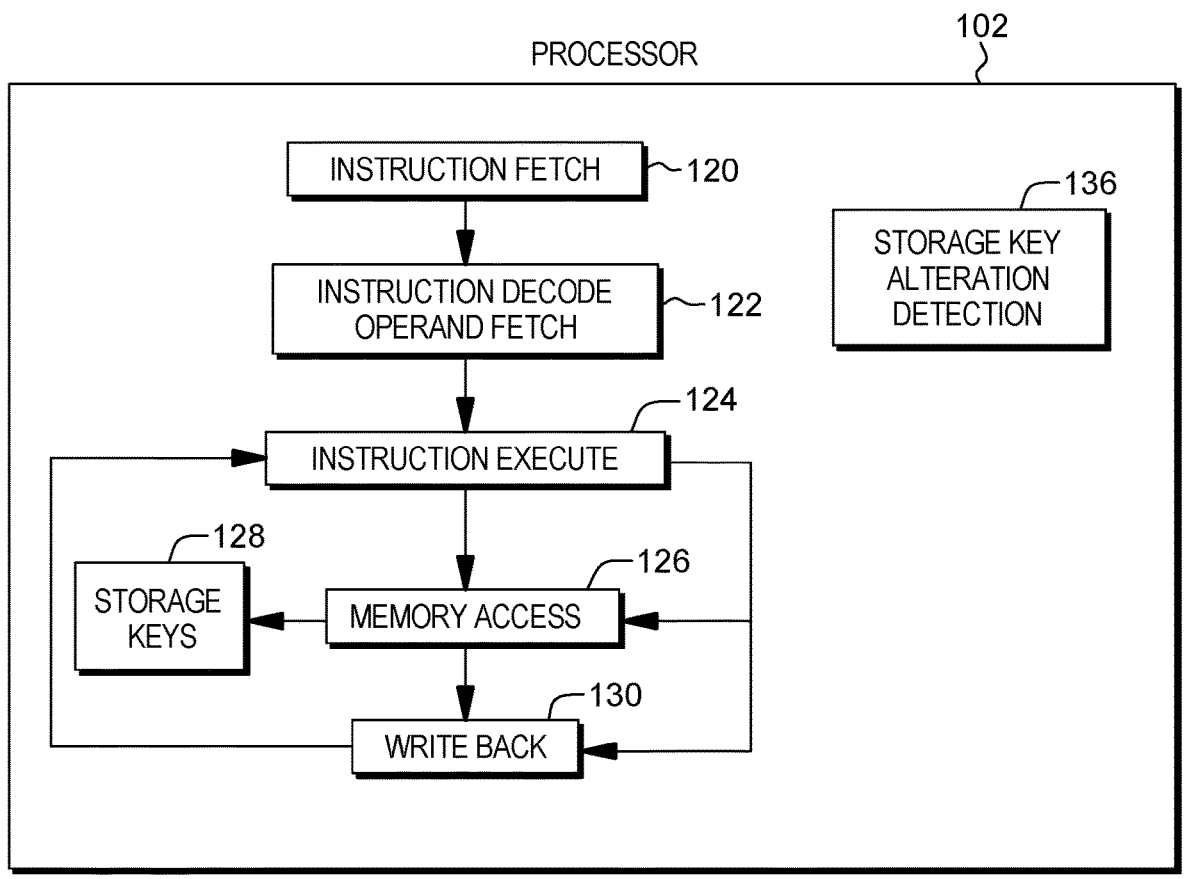
FIG. 1B depicts further details of a processor of FIG. 1A, in accordance with one or more aspects of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with one or more aspects of the present invention, include at least a portion of or have access to one or more other components used in storage key alteration detection (or other processing that may use one or more aspects of the present invention), as described herein. The one or more other components include, for instance, a storage key alteration detection component (or other component) 136.

In one example, memory access component 126 uses one or more storage keys 128 to determine whether the instruction requesting access to one or more blocks of memory is authorized for the type of access being requested. In one example, a storage key is associated, for instance, with each block of memory (e.g., each 4K-byte block) that is available in the configuration.

Another example of a computing environment to incorporate and use one or more aspects of the present invention is described with reference to FIG. 2. In one example, the computing environment is based on the z/Architecture hardware architecture; however, the computing environment may be based on other architectures offered by International Business Machines Corporation or others.

Figure 2:
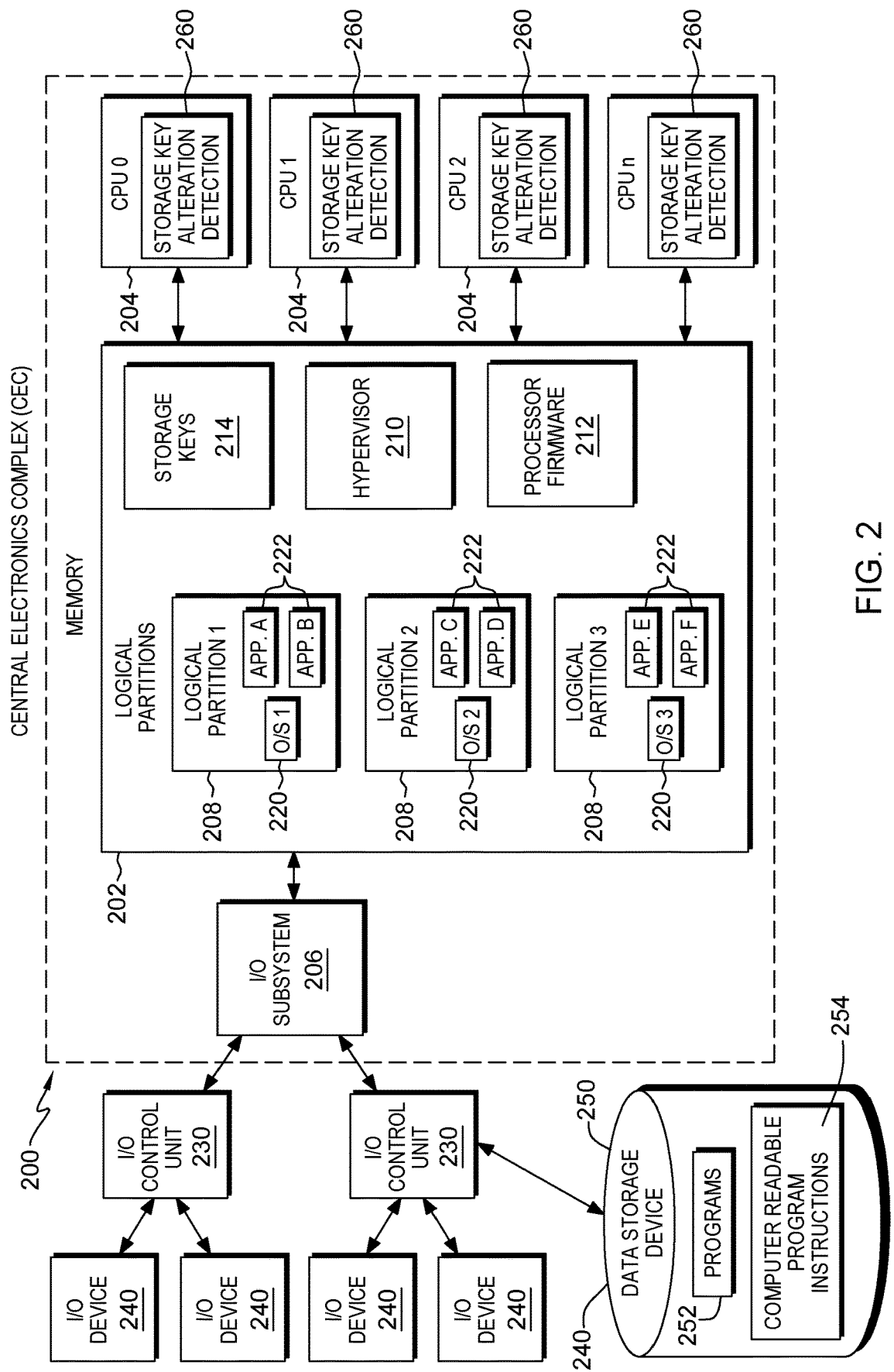
FIG. 2 depicts another example of a computing environment to incorporate and use one or more aspects of the present invention.

Referring to FIG. 2, in one example, the computing environment includes a central electronics complex (CEC) 200. CEC 200 includes a plurality of components, such as, for instance, a memory 202 (a.k.a., system memory, main memory, main storage, central storage, storage) coupled to one or more processors (a.k.a., central processing units (CPUs)) 204, and to an input/output subsystem 206.

Memory 202 includes, for example, one or more logical partitions 208, a hypervisor 210 that manages the logical partitions, processor firmware 212 and associated storage keys 214 (described herein). One example of hypervisor 210 is the Processor Resource/System Manager (PR/SM') hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Each logical partition 208 is capable of functioning as a separate system. That is, each logical partition can be independently reset, run a guest operating system 220 such as a z/OS operating system, or another operating system, and operate with different programs 222. An operating system or application program running in a logical partition appears to have access to a full and complete system, but in reality, only a portion of it is available.

Memory 202 is coupled to processors (e.g., CPUs) 204, which are physical processor resources that may be allocated to the logical partitions. For instance, a logical partition 208 includes one or more logical processors, each of which represents all or a share of a physical processor resource 204 that may be dynamically allocated to the logical partition.

Further, memory 202 is coupled to I/O subsystem 206. I/O subsystem 206 may be a part of the central electronics complex or separate therefrom. It directs the flow of information between main storage 202 and input/output control units 230 and input/output (I/O) devices 240 coupled to the central electronics complex.

Many types of I/O devices may be used. One particular type is a data storage device 250. Data storage device 250 may store one or more programs 252, one or more computer readable program instructions 254, and/or data, etc. The computer readable program instructions may be configured to carry out functions of embodiments of aspects of the invention.

As one example, each processor 204 includes and/or has access to a storage key alteration detection component (or other component) 260 used in detecting alteration of a storage key (and/or other operations of one or more aspects of the present invention). In various examples, there may be one or more components performing these functions. Many variations are possible.

Central electronics complex 200 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 200. Examples include, but are not limited to: microcode, device drivers, redundant processing units, external disk drive arrays, RAID systems, tape drives, and data archival storage systems, etc.

Further, central electronics complex 200 may be operational with numerous other general-purpose or special purpose computing system environments or configurations. Examples of well-known computing systems, environments, and/or configurations that may be suitable for use with central electronics complex 200 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Although various examples of computing environments are described herein, one or more aspects of the present invention may be used with many types of environments. The computing environments provided herein are only examples.

Figure 3:
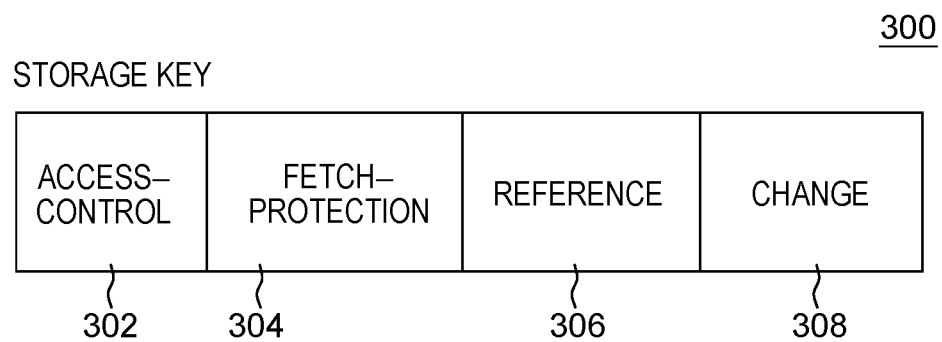
FIG. 3 depicts one example of a storage key, in accordance with an aspect of the present invention.

As indicated above, a storage key is used to control access to a block of memory. In one example, referring to FIG. 3, a storage key 300 includes the following fields:

Access-Control (ACC) 302: If a reference is subject to key-controlled protection, the four access-control bits, bits 0-3, are matched with a four-bit access key, in, e.g., the program status word (PSW), when information is stored and when information is fetched from a location that is protected against fetching.

Fetch-Protection (F) 304: If a reference is subject to key-controlled protection, the fetch-protection bit controls whether key-controlled protection applies to fetch-type references: a zero indicates that only store-type references are monitored and that fetching with any access key is permitted; a one indicates that key-controlled protection applies to both fetching and storing. No distinction is made between the fetching of instructions and of operands.

Reference (R) 306: The reference bit normally is set to, e.g., one each time a location in the corresponding storage block is referred to either for storing or for fetching of information.

Change (C) 308: The change bit is set to one each time information is stored at a location in the corresponding storage block.

In one embodiment, although the reference and change fields are part of the storage key, no PER storage key alteration event is detected if they are changed, e.g., implicitly by a fetch or store operation.

To facilitate detection of an incorrect program changing storage keys and/or a corrupt storage key, in accordance with an aspect of the present invention, a capability is provided to detect alteration of storage keys. The capability includes, for instance, use of a storage key alteration detection component (e.g., storage key alteration detection component 136 or storage key alteration detection component 260). Further details associated with a storage key alteration detection component, in accordance with an aspect of the present invention, are described with reference to FIG. 4.

Figure 4:
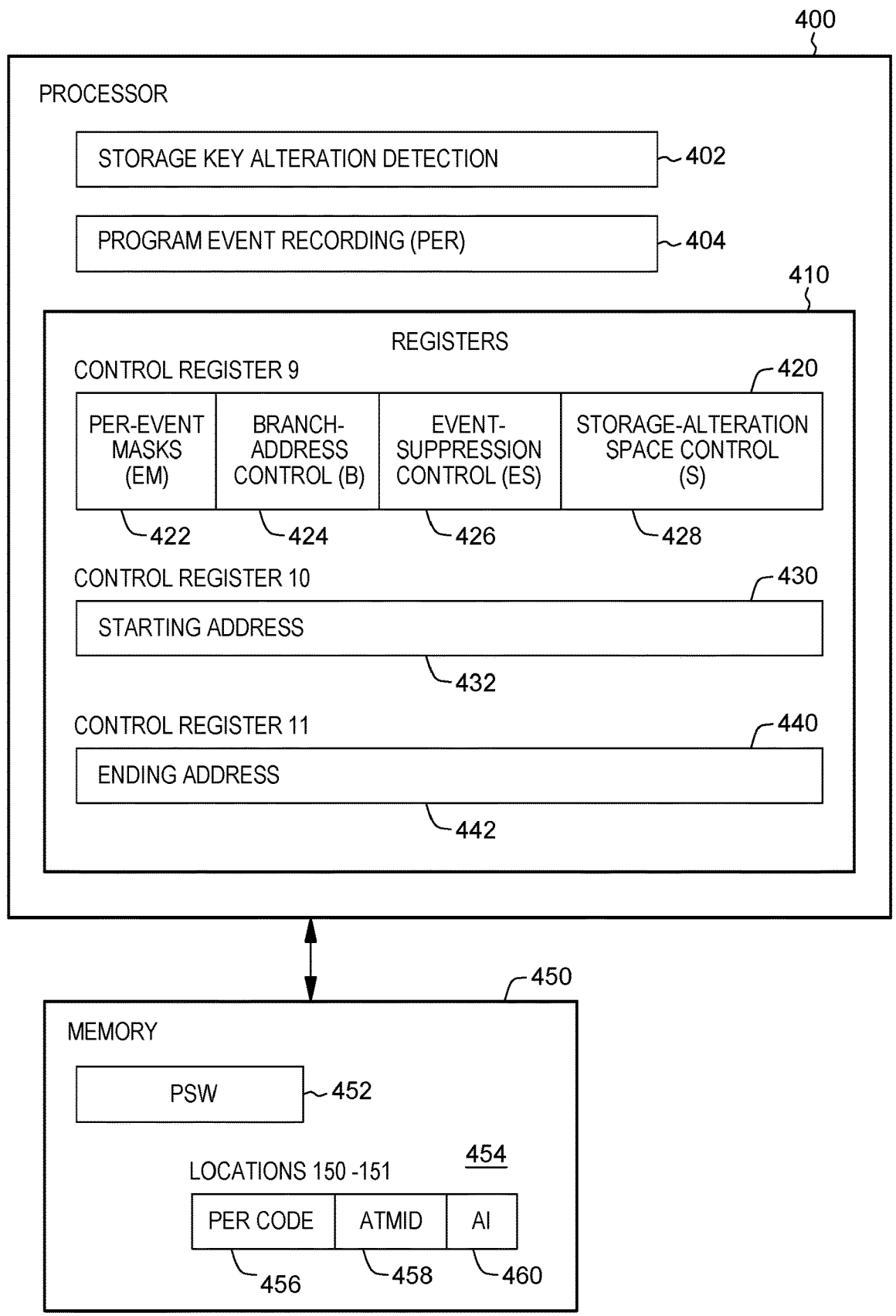
FIG. 4 depicts further details of a storage key alteration detection component used in accordance with an aspect of the present invention.

As shown in FIG. 4, in one example, a processor 400 (such as, e.g., processor 102 or processor 204) includes a storage key alteration detection component 402 (such as, e.g., storage key alteration detection component 136 or storage key alteration detection component 260), which includes or has access to a program event recording component (PER) 404. Program event recording component 404 is used to detect certain events, such as, in accordance with an aspect of the present invention, alteration of a storage key, and to provide a notification of such event, allowing actions to be taken based thereon. Such actions include, for instance, determining whether the storage key alteration was corrupt and if corrupt, identifying an incorrect program changing the storage key and/or a program incorrectly changing the storage key. Based thereon, the program and/or instruction causing the storage key to become corrupt may be corrected. Further, in one example, the program may perform (e.g., automatically) one or more tasks based on receiving notification, such as, e.g., providing an alert, preventing a portion of the program from executing, etc.

Program event recording component 404 has associated therewith a plurality of registers 410, including, for instance:

Control register 9 (420), which includes, for instance, the following fields:

Per-Event Masks (EM) 422: Used to specify which types of events are recognized.

Branch-Address Control (B) 424: Used to indicate when successful branching events occur.

Event-Suppression Control (ES) 426: Used to indicate suppression of notification of select events.

Storage-Alteration Space Control (S) 428: Used to indicate storage alteration events within designated address spaces.

Control register 10 (430) includes a starting address of a designated storage area.

Control register 11 (440) includes an ending address of the designated storage area.

Each of the control registers is described in further detail below with respect to a description of Program Event Recording (PER), as defined for one embodiment of the z/Architecture hardware architecture.

In the description herein, specific locations, specific fields and/or specific sizes of the fields of registers, other locations and/or instructions may be indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

Continuing with FIG. 4, processor 400 is coupled to a memory 450 (e.g., memory 104 or memory 202), which includes data used by PER, as an example. For instance, memory 450 includes program status word (PSW) data 452 and real memory locations 150-151 (454), as well as other real locations and/or data not shown.

In one example, memory locations 454 include, for instance, a PER Code 456 used to indicate the occurrence of PER events; an Addressing-and-Translation-Mode Identification (ATMID) field 458 used to indicate the cause of a PER event; and a PER ASCE Identification (AI) field 460 used in particular instances to identify the address-space-control element (ASCE) that was used to translate the reference that caused the event. Memory locations 454 may include additional, fewer and/or other fields. Further, the use of a particular field may depend on the type of event being detected. For instance, AI field 460 is not used, in one embodiment, in detection of a storage key alteration event, but is used for other types of events. Other variations are possible. Each of the fields is described in further detail below.

The storage key alteration detection component (e.g., component 402) uses PER, in one example, to detect a storage key alteration event and to provide notification to a program regarding the event. Further details regarding detecting a storage key alteration event is described with reference to FIG. 5. In one example, the processing is performed by a processor (e.g., processor 102, 204 or 400). As a particular example, the processing is performed by hardware and/or firmware of the processor.

Figure 5:
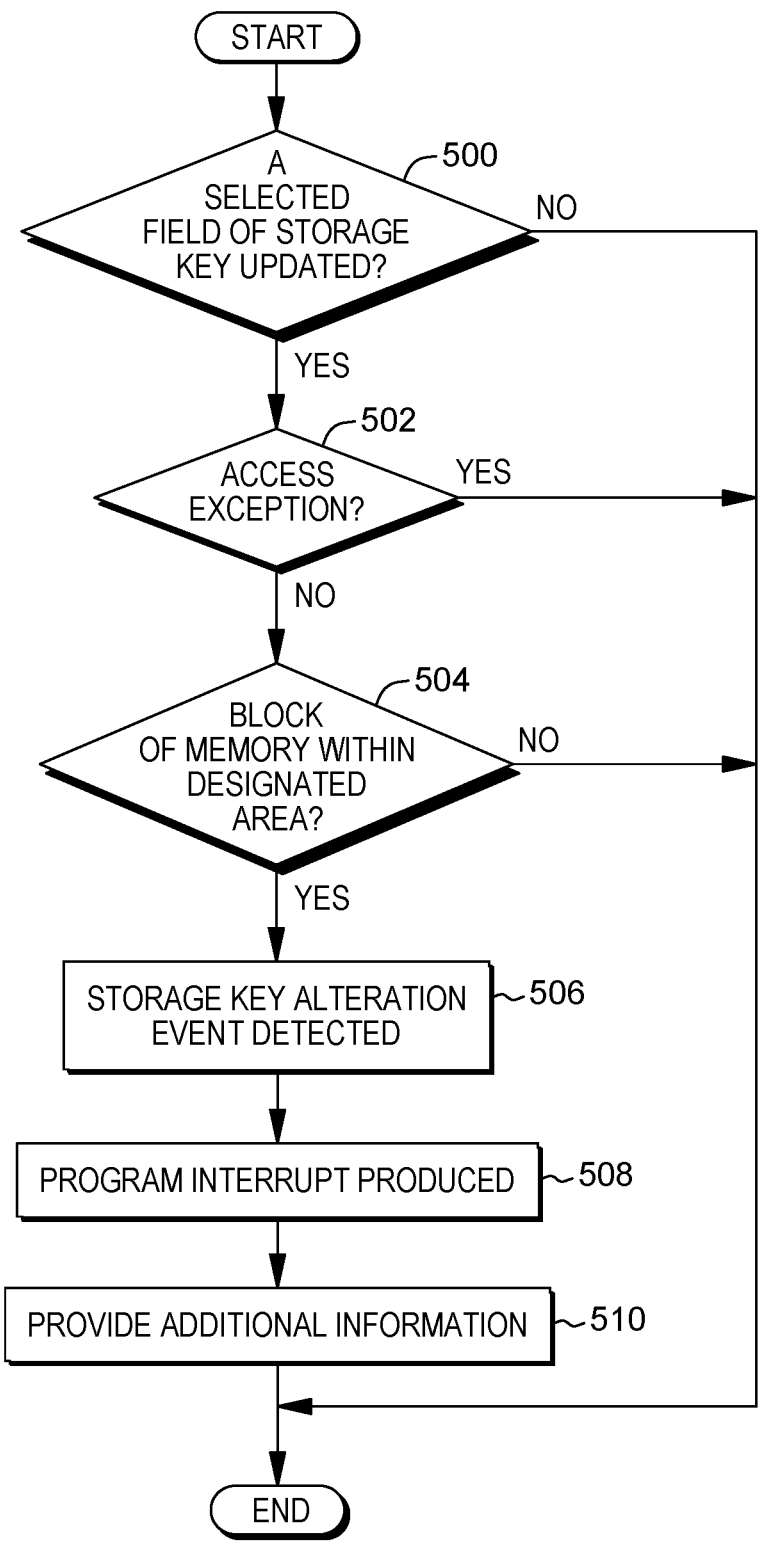
FIG. 5 depicts one example of processing associated with detecting updates to a storage key, in accordance with an aspect of the present invention.

Referring to FIG. 5, in one example, to detect a storage key alteration event, and possibly, a corrupt storage key, the processor determines whether selected fields of a storage key (e.g., storage key 300) have been updated, INQUIRY 500. As examples, the storage key may be updated via one or more instructions of an instruction set architecture (ISA) including, for instance, a Set Storage Key Extended instruction, a Perform Frame Management Function instruction, a Test Block instruction, and a Move Page instruction, each of which is part of the z/Architecture hardware architecture. These instructions are only examples; other instructions may be used to update the storage key.

In one example, the program (executing one or more of those instructions) indicates via PER that an event, e.g., a storage key alteration event, in accordance with an aspect of the present invention, is to be recognized when one or more of those instructions updates one or more of the select fields of the storage key.

As examples, the select fields are the access-control field (e.g., access-control 302) and fetch-protection field (e.g., fetch-protection 304). The update may include updating the selected fields to the same value or a different value. In this example, the updating of the reference field (e.g., reference 306) and the change field (e.g., change 308) without updating one or more of the access-control field and the fetch-protection field do not result in a storage key alteration event.

If a selected field (e.g., the access-control and/or the fetch-protection) is updated, then, in one embodiment, a further determination is made as to whether there has been an access exception, INQUIRY 502. If a selected field has been updated without an access exception, then, in one embodiment, a further inquiry is made as to whether the block of memory (e.g., 4K-byte block) associated with the storage key is within a designated area of memory (e.g., defined by starting address 432 and ending address 442), INQUIRY 504. In another embodiment, the check of the designated area of memory and/or the access exception is optional.

If the selected field is updated without an access exception and the associated block of memory is within the designated area, a storage key alteration event has been detected, STEP 506. In one example, it is the PER facility executing within the processor that makes the determinations and detects the storage key alteration event. Based on detecting the storage key alteration event, a program interrupt is provided, STEP 508. In one example, the program interrupt has a program interrupt code of 0x80. Further, in one embodiment, additional information is provided in, e.g., fixed locations in storage to identify the cause and provide more information to the program, as described below, STEP 510.

Returning to INQUIRY 500, if a selected field has not been updated, or if an access exception has occurred, INQUIRY 502, or if the block of memory is not in the designated area, a storage key alteration event has not been detected, in one example.

As described herein, in one example, the detection of the storage key alteration event is performed using the Program Event Recording (PER) facility of the z/Architecture hardware architecture. PER provides a mechanism to detect and alert a program of selected events, such as, in accordance with an aspect of the present invention, storage key alteration events. Further details of the Program Event Recording facility are described below. For completeness, aspects of the facility that are in addition to, but not needed for, one or more aspects used to detect a storage key alteration event and provide notification of the same, in accordance with an aspect of the present invention, are described. Further, although PER is used to detect and provide notification of a storage key alteration event in the embodiments described herein, in other embodiments, other facilities and/or mechanisms may be used to detect and provide notification of a storage key alteration event.

Program Event Recording (PER)

In one embodiment, PER is used to assist in debugging programs. It permits the program to be alerted to the following types of events, as examples.

Execution of a successful branch instruction. The option is provided of having an event occur only when the branch-target location is within a designated storage area. A designated storage area is further described herein.

Fetching of an instruction from the designated storage area.

Alteration of the contents of the designated storage area. The option is provided of having an event occur only when the storage area is within designated address spaces.

Execution of a Store Using Real Address instruction.

Execution of a transaction end instruction.

Execution of an instruction that accesses storage using an operand address formed from a general register containing zero, based on, e.g., a PER zero-address-detection facility being installed.

Execution of a Set Storage Key Extended instruction, a Perform Frame Management Function instruction, a Move Page instruction or a Test Block instruction that updates the storage key of the designated storage area, based on, e.g., a PER-storage key alteration facility being installed, in accordance with an aspect of the present invention.

The program can selectively specify that one or more of the above types of events be recognized. The information concerning a PER event is provided to the program by means of, for instance, a program interruption (or other mechanism), with the cause of the interruption being identified in the interruption code.

PER Instruction-Fetching Nullification

The PER-3 facility, as an example, may be available on a model implementing the z/Architecture hardware architecture. When this facility is installed, bit 39 of control register 9, when one, specifies that PER instruction-fetching events force nullification. Bit 39 is effective for this purpose when bit 33 of control register 9, the instruction-fetching PER-event mask bit, is also one. When bit 33 is zero, PER instruction-fetching events are not recognized, and bit 39 has no effect. When the PER-3 facility is not installed or bit 39 is zero, PER instruction-fetching events do not force nullification. A PER instruction-fetching event that forces nullification is referred to as a PER instruction-fetching nullification event. A PER event that does not force nullification is referred to as a PER basic event.

When the PER-3 facility is installed, and bit 39 is one, the interruption caused by a PER instruction-fetching event occurs before the fetched instruction is executed, the PER instruction-fetching nullification event is indicated, no other PER events and no other program interruption conditions are reported, and execution of the instruction is nullified. When the PER-3 facility is not installed, or bit 39 is zero, nullification is not forced, the PER instruction-fetching basic event is indicated, other PER events and other program interruption conditions may be concurrently reported, and the execution of the instruction may be completed, terminated, suppressed, or nullified. In the absence of other conditions, the interruption caused by the PER instruction-fetching basic event occurs after execution of the fetched instruction, or units of operation thereof, are completed.

Control-Register Allocation and Address-Space-Control Element

The information for controlling PER resides, for instance, in control registers 9, 10, and 11 and the address-space-control element.

Depending on the model, when any or all of control registers 9, 10 or 11 contain non-zero values, address compare controls may be disabled and remain disabled even if the control registers 9 to 11 transition back to zeros.

The information in the control registers has the following format, in one example, and reference is made to FIG. 4.

Control register 9 (420) includes, for instance:

PER-Event Masks (EM) 422: Bits 32-39 specify which types of events are recognized. Bits 32-34 and 36 are available and control successful branching events, instruction-fetching basic events and storage alteration events. In accordance with an aspect of the present invention, when the PER-storage-key alteration facility is installed, bit 35 of the PER-event masks is also used. When the PER zero-address-detection facility is installed, bit 37 of the PER-event masks is used. When the PER-3 facility is installed, bit 39 of the PER-event masks is used. In the ESA/390 compatibility mode, it is unpredictable whether the storage-key-alteration, zero-address-detection, instruction-fetching-nullification masks, bits 35, 37 and 39, respectively, are supported. The bits are assigned as follows, in one example:

Bit 32: Successful-branching event
Bit 33: Instruction-fetching event
Bit 34: Storage-alteration event
Bit 35: Storage-key-alteration event
Bit 36: Store-using-real-address event (bit 34 is to be one also)
Bit 37: Zero-address-detection event
Bit 38: Transaction-end event
Bit 39: Instruction-fetching nullification event (bit 33 is to be one)

Bits 32-34 and bit 36, when ones, specify that the corresponding types of events be recognized. However, bit 36 is effective for this purpose when bit 34 is also one. When bit 34 is one, the storage-alteration event is recognized. When bits 34 and 36 are ones, both the storage-alteration event and the store-using-real-address event are recognized. When a bit is zero, the corresponding type of event is not recognized. When bit 34 is zero, both the storage-alteration event and the store-using-real-address event are not recognized.

When the PER-3 facility is not installed, bit 39 is ignored. Bit 39 is effective when bit 33 is also one. When bit 33 is one, and the PER-3 facility is installed, and bit 39 is one, the PER instruction-fetching-nullification event is recognized. When bit 33 is one and bit 39 is zero (or the PER-3 facility is not installed), the PER instruction-fetching basic event is recognized. When bit 33 is zero, neither the PER instruction-fetching basic event nor the PER instruction-fetching nullification event is recognized.

When the transaction-execution facility is not installed, or when the facility is installed and bit 38 is zero, transaction-end events are not recognized. When the transaction-execution facility is installed and bit 38 is one, a transaction-end event is recognized as a result of completion of an outermost transaction end instruction. In the ESA/390-compatiblity mode, bit 38 of control register 9 is ignored.

When the PER-storage-key-alteration facility is not installed, bit 35 is ignored. When bit 35 is one and the PER-storage-key alteration facility is installed, in accordance with an aspect of the present invention, a storage-key-alteration event is recognized when, for instance, any of the following instructions executes and updates the ACC or F bits of the storage key associated with a 4K-byte block of storage that lies, e.g., within the designated area:

Move Page when the Move Page and Set Key facility is installed and key function control (KFC) (bits 51-53 of general register 0) contains a value of 4 or 5
Perform Frame Management Function when SK (bit 46 of general register $R_1$) is one Set Storage Key Extended
Test Block when the model's implementation updates the storage key.

In addition to PER-Event Masks 422, control register 9 includes various controls described below. Additional, fewer and/or other controls may be used.

Branch-Address Control (B) 424: Bit 40 of control register 9 specifies, when one, that successful branching events occur only for branches that are to a location within the designated storage area. When bit 40 is zero, successful branching events occur regardless of the branch-target address.

Event Suppression Control (ES) 426: When the CPU is in the transactional execution mode at the beginning of an instruction, bit 41 of control register 9 specifies, when one, that the PER event masks in bits 32-34, 36, 37 and 39 of the register are to be ignored and assumed to contain zeros. Except as noted below, when the CPU is not in the transactional execution mode at the beginning of the instruction, or when bit 41 of the register is zero, all PER event masks operate as defined.

When (a) an outermost Transaction Begin instruction is executed, (b) there are no concurrent program exception conditions, and (c) the ES control is one, any PER storage-alteration or zero-address-detection event for the TBEGIN-specified Transaction Diagnostic Block (TDB) and any instruction-fetching basic event are suppressed; instruction-fetching nullification events are not suppressed in this case. In the ESA/390 compatibility mode, the event-suppression control is ignored.

Storage-Alteration-Space Control (S) 428: Bit 42 of control register 9 specifies, when one, that storage-alteration events occur as a result of references to the designated storage area only within designated address spaces. An address space is designated as one for which storage-alteration events occur by means of the storage-alteration-event bit in the address-space-control element that is used to translate references to the address space. Bit 42 is ignored when DAT (Dynamic Address Translation) is not in effect. When DAT is not in effect or bit 42 is zero, storage-alteration events are not restricted to occurring for only particular address spaces.

Control register 10 (430) includes, for instance:

PER Starting Address 432: Bits 0-63 of control register 10 are the address of the beginning of the designated storage area. In the ESA/390 compatibility mode, it is unpredictable whether bit 32 of the PER starting address is treated as being zero.

Control register 11 (440) includes, for instance:

PER Ending Address 442: Bits 0-63 of control register 11 are the address of the end of the designated storage area. In the ESA/390 compatibility mode, it is unpredictable whether bit 32 of the PER starting address is treated as being zero.

Address Space Control Element (ASCE):

When the storage-alteration-space control in control register 9 is one, bit 56 of the address space control element specifies, when one, that the address space defined by the address space control element is one for which storage-alteration events can occur. Bit 56 of the ASCE is examined when the address space control element is used to perform dynamic address translation for a storage-operand store reference.

PER Operation

In one embodiment, PER is under control of bit 1 of the PSW (e.g., PSW 452), the PER mask. As an example, when the PER mask and a particular PER-event mask bit are ones, the CPU is enabled for the corresponding type of event; otherwise, it is disabled.

An interruption due to a PER basic event normally occurs after the execution of the instruction responsible for the event. The occurrence of the event does not affect the execution of the instruction, which may be completed, partially completed, terminated, suppressed, or nullified. However, recognition of a storage-alteration event causes no more than 4K bytes to be stored beginning with the byte that caused the event, and recognition of a zero-address-detection event may occur on completion of a unit of operation, recognition of these PER events may result in partial completion of an interruptible instruction. When a storage-key-alteration event is detected on an instruction that updates the storage key for multiple 4K-byte blocks, in one example, that instruction is interrupted immediately upon setting the storage key for the block where the event was detected.

When the CPU is disabled for a particular PER event at the time it occurs, either by the PER mask in the PSW or by the masks in control register 9, the event is not recognized.

A change to the PER mask in the PSW or to the PER control fields in control registers 9, 10 and 11 affects PER starting with the execution of the immediately following instruction. Thus, if, as a result of the change, an instruction-fetching nullification event applies to the immediately following instruction, execution of that instruction will be nullified and the instruction-fetching nullification event reported.

A change to the storage-alteration-event bit in an address-space-control element in control register 1, 7, or 13 also affects PER starting with the execution of the immediately following instruction. A change to the storage-alteration-event bit in an address-space-control element that may be obtained, during access-register, from an ASN-second-table entry in either main storage or the ALB does not necessarily have an immediate, if any effect on PER. However, PER is affected immediately after either Purge ALB or Compare And Swap And Purge that purges the ALB is executed.

If a PER basic event occurs during the execution of an instruction which changes the CPU from being enabled to being disabled for that type of event, that PER event is recognized.

PER basic events may be recognized in a trial execution of an instruction, and subsequently the instruction, DAT-table entries, and operands may be re-fetched for the actual execution. If any re-fetched field was modified by another CPU or by a channel program between the trial execution and the actual execution, it is unpredictable whether the PER events indicated are for the trial or the actual execution.

Identification of Cause

A program interruption for PER sets bit 8 of the interruption code to one and places identifying information in real storage locations 150-159. When the PER event is a storage-alteration event or a zero-address-detection event, information is also stored in location 161. Additional information is provided by means of the instruction address in the program old program status word (PSW) and the ILC (Interruption Length Code).

In one example, locations 150-151 (e.g., locations 454 of FIG. 4) include:

PER Code 456: The occurrence of PER events is indicated by ones in bit positions 0-7. The bit position in the PER code for a particular type of event is as follows, in one embodiment:

| Bit | PER Event |
| --- | --- |
| 0 | Successful-branching |
| 1 | Instruction-fetching |
| 2 | Storage-alteration |
| 3 | Storage-key-alteration |
| 4 | Store-using-real-address |
| 5 | Zero-address detection |
| 6 | Transaction-end |
| 7 | Instruction-fetching nullification (PER-3) |

A one in bit position 2 and a zero in bit position 4 of location 150 indicate a storage-alteration event, while ones in bit positions 2 and 4 indicate a store-using-real address event. When a program interruption occurs, more than one type of PER basic event can be concurrently indicated. However, when a storage-alteration event and a zero-address-detection event are concurrently recognized, only the storage-alteration-event is indicated. Additionally, if another program-interruption condition exists, the interruption code for the program interruption may indicate both the PER basic events and the other condition.

When a program interruption occurs for a PER instruction-fetching nullification event, bits 1 and 7 are set to one in the PER code. No other PER events are concurrently indicated.

When the transactional execution facility is installed, and a program interruption occurs for a transactional event, bit 6 is set to one in the PER code. If an instruction-fetching basic event coincides with the transaction-end event, bit 1 is also set to one in the PER code. No other PER events are concurrently indicated with a transaction-end event.

A zero is stored in bit position 3 of locations 150-151. When the PER zero-address-detection facility is not installed, zero is stored in bit position 5. When the transactional-execution facility is not installed, zero is stored in bit position 6. When PER-3 is not installed, zero is stored in bit position 7.

Addressing-and-Translation-Mode Identification (ATMID) 458: During a program interruption when a PER event is indicated, bits 31, 32, 5, 16 and 17 of the PSW (e.g., PSW 452) at the beginning of the execution of the instruction that caused the event may be stored in bit positions 8 and 10-13, respectively, of real locations 150-151. If bits 31, 32, 5, 16 and 17 are stored, then a one bit is stored in bit position 9 of locations 150-151. If bits 31, 32, 5, 16, and 17 are not stored, then zero bits are stored in bit positions 8-13 of locations 150-151.

Bits 8-13 of real locations 150-151 are named the addressing-and-translation-mode identification (ATMID). Bit 9 is named the ATMID-validity bit. When bit 9 is zero, it indicates that an invalid ATMID (e.g., all zeros) was stored.

The meanings of the bits of a valid ATMID are as follows, in one embodiment:

| Bit | Meaning |
|---|---|
| 8 | PSW bit 31 |
| 9 | ATMID-validity bit |
| 10 | PSW bit 32 |
| 11 | PSW bit 5 |
| 12 | PSW bit 16 |
| 13 | PSW bit 17 |

A valid ATMID is stored, for instance, only if the PER event was caused by one of the following instructions: Branch And Save And Set Mode (BASSM), Branch And Set Authority (BSA), Branch And Set Mode (BSM), Branch In Subspace Group (BSG), Load PSW (LPWS), Load PSW extended (LPWSE), Program Call (PC), Program Return (PR), Program Transfer (PT), Program Transfer With Instance (PTI), Resume Program (RP), Set Address Space Control (SAC), Set Address Space Control Fast (SACF), Set Addressing Mode (SAM24, SAM31, SAM64), Set System Mask (SSM), Store Then And System Mask (STNSM), Store Then Or System Mask (STOSM), Supervisor Call (SVC), and Trap (TRAP2, TRAP4).

It is unpredictable whether a valid ATMID is stored if the PER event was caused by any other instruction. The value of the PER instruction-fetching-nullification-event mask bit does not affect the contents of the ATMID field.

PER ASCE Identification (AI) 460: If the PER code contains an indication of a storage-alteration event (e.g., bit 2 is one and bit 4 is zero), or a zero-address detection event (e.g., bit 5 is one), and the event occurred when both PSW bit 5 was one and an ASCE was used to translate the reference that caused the event, bits 14 and 15 of locations 150-151 are set to identify the address-space-control element (ASCE) that was used to translate the reference that caused the event, as follows, in one example:

| Bits 14-15 | Meaning |
|---|---|
| 00 | Primary ASCE was used |
| 01 | An AR-specified ASCE was used. The PER access ID, real location 161, can be examined to determine the ASCE used. Even when an AR-specified ASCE is used, if the contents of the AR designate |

-continued

| Bits 14-15 | Meaning |
|---|---|
| | the primary, secondary, or home ASCE, bits 14 and 15 may be set to 00, 10, or 11, respectively, instead of to 01. |
| 10 | Secondary ASCE was used. |
| 11 | Home ASCE was used. |

In addition to the above, the PER facility includes, for instance:

PER Address: The PER-address field at locations 152-159 (in memory) contains the instruction address used to fetch the instruction responsible for the recognized PER event or events. In the ESA/390 compatibility mode, the PER-address field at locations 152-155 contains bits 33-63 of the instruction address used to fetch the instruction responsible for the recognized PER event or events. Bit 0 of location 152 is stored as zero.

When the instruction is the target of an execute-type instruction (Execute or Execute Relative Long), the instruction address used to fetch the execute-type instruction is placed in the PER-address field.

PER Access Identification (PAID): If a storage-alteration event or zero-address-detection event is indicated in the PER code, and the PER ASCE identification (AI, bits 14-15 of locations 150-151) contains 01 binary, an indication of the address space to which the event applies is stored at location 161 (of real memory). The number of the access register used is stored in bit positions 4-7 of location 161, and zeros are stored in bit positions 0-3. The contents of location 161 are unpredictable when the PER ASCE identification does not contain 01 binary.

Instruction Address: The instruction address in the program old PSW is the address of the instruction which would have been executed next, unless another program condition is also indicated, in which case the instruction address is that determined by the instruction ending due to that condition. When a PER-instruction-fetching nullification event is recognized, the instruction address in the program old PSW is the address of the instruction responsible for the event. This is same address stored in the PER address field in real storage locations 152-159.

ILC: For PER instruction nullification events, the ILC is 0. For PER basic events, the ILC indicates the length of the instructions designated by the PER address, except when a concurrent specification exception for the PSW introduced by Load PSW, Load PSW Extended, Program Return, or a supervisor-call interruption sets of ILC of 0.

Priority of Indication

When a PER instruction-fetching nullification event is recognized and other program interruption conditions exist, the program interruption condition with the highest priority is indicated.

When a PER instruction-fetching nullification event is indicated, no other PER events are indicated. When a PER instruction-fetching nullification event is not indicated, then more than one PER basic event may be recognized and reported. The remainder of this section applies to these cases.

When a program interruption for PER occurs and more than one PER basic event has been recognized, all recognized PER events are concurrently indicated in the PER code. However, when either a storage-alteration or store-using real-address event is recognized concurrently with a zero-address-detection event, only the storage alteration or store-using-real-address event is indicated.

When a zero-address-detection event is recognized for more than one storage operand, it is unpredictable which operand's ASCE identification and AR number, if applicable, are stored in locations 150-151 and 161.

In the case of an instruction-fetching basic event for Supervisor Call, the program interruption occurs immediately after the supervisor-call interruption.

If a PER basic event is recognized during the execution of an instruction which also introduces a new PSW with the type of PSW-format error which is recognized early, both the specification exception and PER are indicated concurrently in the interruption code of the program interruption. If the PSW-format error is of the type which is recognized late, only PER is indicated in the interruption code. In both cases, the invalid PSW is stored as the program old PSW.

Recognition of a PER basic event does not normally affect the ending of instruction execution. However, in the following cases, execution of an interruptible instruction is not completed normally:

1. When the instruction is due to be interrupted for an asynchronous condition (I/O, external, restart, or repressible machine-check condition), a program interruption for the PER event occurs first, and the other interruptions occur subsequently (subject to the mask bits in the new PSW) in the normal priority order.
2. When the stop function is performed, a program interruption indicating the PER event occurs before the CPU enters the stopped state.
3. When any program exception is recognized, PER events recognized for that instruction execution are indicated concurrently.
4. Depending on the model, in certain situations, recognition of a PER event may appear to cause the instruction to be interrupted prematurely without concurrent indication of a program exception, without an interruption for any asynchronous condition, and without the CPU entering the stopped state. In particular, recognition of a storage-alteration event causes no more than 4K bytes to be stored beginning with the byte that caused the event, and recognition of a zero-address-detection event may occur on completion of a unit of operation.

In cases 1 and 2 above, if the only PER event that has been recognized is an instruction-fetching basic event and another unit of operation of the instruction remains to be executed, the event may be discarded, with the result that a program interruption does not occur. Whether the event is discarded is unpredictable.

Recognition of a PER instruction-fetching nullification event causes execution of the instruction responsible for the event to be nullified.

Storage-Area Designation

Three types of PER events—instruction fetching, storage alteration and storage key alteration—in one embodiment, involve the designation of an area in storage. Successful-branching events may involve this designation. The storage area starts at the location designated by the starting address in control register 10 and extends up to and including the location designated by the ending address in control register 11. The area extends to the right of the starting address.

An instruction-fetching event occurs whenever the first byte of an instruction or the first byte of the target or an execute-type instruction, as designated by the instruction address (before any address translation is applied) is fetched from the designated area.

A storage-alteration event occurs when a store access is made to the designated area by using an operand address that is defined to be a logical or virtual address. However, when DAT is on and the storage-alteration space control in control register 9 is one, a storage area is within an address space for which the storage-alteration-event bit in the address-space-control element is one. A storage-alteration event does not occur for a store access made with an operand address defined to be a real address.

When the branch-address control in control register 9 is one, a successful-branching event occurs when the first byte of the branch-target instruction, as designated by the branch address (before any address translation is applied) is within the designated area.

A storage-key alteration event occurs when any byte within the 4K-byte block associated with the updated storage key lies within the designated area. In one example, all bits of control registers 10 and 11, including the low-order 12 bits, participate in the determination of the designated area. For instance, assume CR 10=0x0000000000123017 and CR11=0x0000000000123016. If the definition ignored the low-order 12 bits of the control registers, then, in one example, only a single 4K-byte block at address 0x0000000000123000 would be in the designated area.

Further, assume CR 10=0X0000000000123001 and CR 11=0x0000000000123FF and further assume that the definition indicated that only the first byte of the 4K-byte block had to lie within the designated area, then, for instance, an SSKE to address 0x0000000000123000 would not hit the designated area.

In one example, the designated storage area may be set to a particular range if it is known that a storage key being corrupted is in that range. Alternatively, CR 10 may be set equal to 0x0000000000000000 and CR 11 may be set to 0xFFFFFFFFFFFFFFFF to detect a PER storage key alteration event whenever any storage key is modified. Other variations are also possible.

As examples, the address is a real address for Test Block, real or absolute address for Perform Frame Management Function and Set Storage Key Extended, and a logical address for Move Page.

The set of addresses designated for successful branching, instruction fetching, storage-alteration events and storage key alteration events wraps around at address $2^{64}-1$; that is, address 0 is considered to follow address $2^{64}-1$. When the starting address is less than the ending address, the area is contiguous. When the starting address is greater than the ending address, the set of locations designated includes the area from the starting address to address $2^{64}-1$ and the area from address 0 to, and including, the ending address. When the starting address is equal to the ending address, only that one location is designated.

Address comparison for successful branching, instruction fetching, storage-alteration, and storage-key-alteration events is performed using 64-bit addresses. This is accomplished in the 24-bit or 31-bit addressing mode by extending the virtual, logical, or instruction address on the left with 40 or 33 zeros, respectively, before comparing it with the starting and ending addresses.

Example programming note: In some models, performance of address-range checking is assisted by means of an extension to each page-table entry in the TLB (translation look-aside buffer). In such an implementation, changing the contents of control registers 10 and 11, when the successful branching, instruction fetching, or storage alteration event mask is one, or setting any of these PER-event masks to one, may cause the TLB to be cleared of entries. This may be experienced even when the CPU is disabled for PER events. Thus, when possible, the program should avoid loading control registers 9, 10, or 11.

Example PER Events include, for instance:

Successful Branching

When the branch-address control in control register 9 is zero, a successful-branching event occurs independent of the branch-target address. When the branch-address control is one, a successful-branching event occurs only when the first byte of the branch-target instruction is in the storage area designated by control registers 10 and 11.

Subject to the effect of the branch-address control, a successful-branching event occurs whenever one of the following instructions causes branching, as examples: Branch And Link (BAL, BALR); Branch And Save (BAS, BASR); Branch And Save And Set Mode (BASSM); Branch And Set Authority (BSA); Branch And Set Mode (BSM); Branch And Stack (BAKR); Branch In Subspace Group (BSG); Branch Indirect On Condition, Branch on Condition (BC, BCR); Branch On Count (BCT, BCTR, BCTG, BCTGR); Branch On Index High (BXH, BXHG); Branch On Index Low Or Equal (BXLE, BXLEG); Branch Relative And Save; Branch Relative And Save Long; Branch Relative On Condition (BRC); Branch Relative On Condition Long (BRCL); Branch Relative On Count (BRCT); Branch Relative On Count High (BRCTH); Branch Relative On Index High (BRXH, BRXHG); Branch Relative On Index Low Or Equal (BRXLE, BRXLG); Compare And Branch (CRB, CGRB); Compare And Branch Relative (CRJ, CGRJ); Compare Immediate And Branch (CM, CGIB); Compare Immediate And Branch Relative (CIJ, CGIJ); Compare Logical And Branch (CLRB, CLGRB); Compare Logical And Branch Relative (CLRJ, CLGRJ); Compare Logical Immediate And Branch (CLIB, CLUB); Compare Logical Immediate And Branch Relative (CLIJ, CLGIJ); Resume Program (RP); and Trap (TRAP2, TRAP4).

Subject to the effect of the branch-address control, a successful-branching event also occurs whenever one of the following instructions causes branching: Program Call (PC); Program Return (PR); Program Transfer (PT); and Program Transfer With Instance (PTI).

For Program Call, Program Return, Program Transfer, and Program Transfer With Instance, the branch-target address is considered to be the new instruction address that is placed in the PSW by the instruction.

When the guarded storage facility is enabled, a successful branching event is recognized as a result of a guarded storage event caused by either of the following instructions: Load Guarded (LGG) and Load Logical and Shift Guarded (LLGFSG).

When the branch address control is one, the branch address is considered to be the contents of the guarded storage event handler address (GSEHA) field in the guarded storage event parameter list (GSEPL).

A successful-branching event causes a PER successful-branching event to be recognized if bit 32 of the PER-event masks is one and the PER mask in the PSW is one.

A PER successful-branching event is indicated by setting bit 0 or the PER code to one.

Instruction Fetching

An instruction-fetching event occurs if the first byte of the instruction is within the storage area designated by control registers 10 and 11. An instruction-fetching event also occurs if the first byte of the target of an execute-type instruction is within the designated storage area.

Instruction-Fetching Basic Event: An instruction-fetching event causes a PER instruction-fetching basic event to be recognized if the PER mask in the PSW is one and bit 33 of the PER-event masks is one and either the PER-3 facility is not installed, or bit 39 of the PER-event masks is zero.

If an instruction-fetching basic event is the only PER event recognized for an interruptible instruction that is to be interrupted because of an asynchronous condition (I/O, external, restart, or repressible machine-check condition) or the performance of the stop function, and if a unit of operation of the instruction remains to be executed, the instruction-fetching event may be discarded, and whether it is discarded is unpredictable.

The PER instruction-fetching basic event is indicated by setting bit 1 of the PER code and bit 7 of the PER code to zero.

Instruction-Fetching Nullification Event: An instruction-fetching event causes a PER instruction-fetching nullification event to be recognized if the PER mask in the PSW is one and bit 33 of the PER-event masks is one and the PER-3 facility is installed and bit 39 of the PER-event masks is one.

The PER instruction-fetching nullification event is indicated by setting bits 1 and 7 of the PER code to one.

Storage Alteration

A storage alteration event occurs whenever a CPU, by using a logical or virtual address, makes a store access without an access exception to the storage area designated by control registers 10 and 11. However, when DAT is on and the storage-alteration-space control in control register 9 is one, the event occurs only if the storage-alteration-event bit is one in the address-space-control element that is used by DAT to translate the reference to the storage location.

The contents of storage are considered to have been altered whenever the CPU executes an instruction that causes all or part of an operand to be stored within the designated storage area. Alteration is considered to take place whenever storing is considered to take place for purposes of indicated protection exceptions, except that recognition does not occur for the storing of data by a channel program. Storing constitutes alteration for PER purposes even if the value stored is the same at the original value. Additionally, the contents of a TBEGIN-specified TDB are considered to have been altered by the execution of an outermost TBEGIN instruction, regardless of whether the TDB is actually stored by a transaction being aborted; it is unpredictable whether a PER storage alteration event is detected for the first operand location of an inner TBEGIN instruction.

Implied locations that are referred to by the CPU are not monitored. Such locations include PSW and interruption-code locations, the program interruption transaction diagnostic block, the enhanced monitor exception counter, and the trace entry designated by control register 12. These locations, however, are monitored when information is stored there explicitly by an instruction. Similarly, monitoring does not apply to the storing of data by a channel program. Implied locations in the linkage stack, which are stored in by instructions that operate on the linkage stack, and enhanced monitor counting array entries which are stored in by the Monitor Call instruction, are monitored.

The I/O instructions are considered to alter the second operand location only when storing actually occurs.

Storage alteration does not apply to instructions whose operands are specified to have real or absolute addresses. Thus, storage alteration does not apply to Compare and Replace DAT Table Entry, Invalidate DAT Table Entry (invalidation-and-clearing operation), Invalidate Page Table Entry, Page In, Perform Frame Management Function, Reset Reference Bit Extended, Reset Reference Bits Multiple, Set Storage Key Extended, Store Using Real Address, Test Block, and Test Pending Interruption (when the effective address is zero). Storage alteration does not apply to the store to real location 200 by Store Facility List, nor does it apply to stores to the trace table by instructions that cause tracing to occur.

A storage alteration event causes a PER storage-alteration event to be recognized if bit 34 of the PER-event masks is one and the PER mask in the PSW is one. Bit 36 of the PER-event masks is ignored when determining whether a PER storage-alteration event is to be recognized.

A per storage-alteration event is indicated by setting bit 2 of the PER code to one and bit 4 of the PER code to zero.

Store Using Real Address

A store-using-real-address event occurs whenever the Store Using Real Address instruction is executed.

There is no relationship between the store-using-real-address event and the designated storage area.

A store-using-real-address event causes a PER store-using-real-address event to be recognized if bits 34 and 36 of the PER-event masks are ones and the PER mask in the PSW is one.

A PER store-using-real-address event is indicated by setting bits 2 and 4 of the PER code to one.

Zero-Address Detection

When the PER zero-address-detection facility is installed, a zero-address-detection event occurs whenever a CPU makes a storage access using an effective operand address formed from a general register, or subfield of a general register, containing zero. However, during execution of an RX-, RXE-, RXF-, RXY-, or VRX-format instruction, the event occurs, e.g., only if the CPU makes a storage access using an effective operand address formed under one of the following conditions:

1. The base register number is zero, the index register number is non-zero, and the index register contains zero.
2. The index register number is zero, the base register number is non-zero, and the base register contains zero.
3. When both the base register number and the index register number are non-zero, it is unpredictable which one of the following conditions causes the event:
   (a) The base register contains zero.
   (b) The sum of the contents of the base register and the index register is zero.

During the execution of a VRV-format instruction, it is unpredictable which one or more of the following conditions will cause the event to occur if the CPU makes a storage access:

1. The base register number is zero, and the value of the indexed element of the second operand is zero.
2. The base register number is non-zero and the base register contains zero.
3. The sum of the contents of the base register and the value of the indexed element is zero.

Except as noted below, zero-address detection for an operand address is performed whenever a fetch, store, or update reference is made to storage using the address, and zero-address detection is performed only when an operand address is used to access storage.

Except for Branch Indirect On Condition, zero-address detection is not performed on the branch address of branch-type instructions. For Branch Indirect On Condition, zero-address detection is performed on the second operand address but not on the branch address fetched from the second operand. For Load Guarded and Load Logical And Shift Guarded, zero-address detection is performed on the second operand address of the instruction, even though these are considered to be branch-type instructions when a guarded-storage event is recognized.

Zero-address detection is also not performed on the target-instruction address of the Execute instruction and the contents of general register $R_2$ for the Test Block instruction.

For Compression Call, Convert UTF-16 To UTF-32, Convert UTF-16 To UTF-8, Convert UTF-32 To UTF-16, Convert UTF-32 To UTF-8, Convert UTF-8 To UTF-16, and Convert UTF-8 To UTF-32, it is unpredictable whether a PER zero-address-detection event is recognized for any storage operand when the end of the first operand is reached, but the end of the second operand has not been reached.

Conditions for causing a zero-address-detection event are evaluated at the start of instruction execution. It is unpredictable if those conditions are reevaluated during instruction execution.

Except as noted below, the determination of whether a register's contents are zero is dependent upon the current addressing mode, as follows:

In the 24- and 31-bit addressing modes, a register is considered to contain zero if bits 32-63 are all zeros.

In the 64-bit addressing mode, a register is considered to contain zero if bits 0-63 are all zeros.

For Compare And Replace DAT Table Entry, when bit position 59 of general register $R_2$ contains zero, general register $R_2$ is considered to contain zero if bits 0-52 are all zeros; when bit position 59 of general register $R_2$ contains one, general register $R_2$ is considered to contain zero if bits 0-51 are all zeros. For Invalidate DAT Table Entry, general register $R_1$ is considered to contain zero if bits 0-51 are all zeros, and for Invalidate Page Table Entry, general register $R_1$ is considered to contain zero if bits 0-52 are all zeros, regardless of the addressing mode.

Zero-Address-Detection Event:

A zero-address-detection event causes a PER zero-address-detection event to be recognized if the PER mask in the PSW is one and bit 37 of the PER-event mask is one.

A PER zero-address-detection event is indicated by setting bit 5 of the PER code to one.

Transaction End

When the CPU is in the transactional-execution mode at the beginning of an outermost Transaction End instruction, a transaction end event occurs at the completion of the instruction.

There is no relationship between the transaction end event and the designated storage area.

A transaction end event causes a PER transaction end event to be recognized if bit 38 of the PER event mask is one and the PER mask in the PSW is one.

A PER transaction end event is indicated by setting bit 6 of the PER code to one.

A transaction-end event is not recognized when a Transaction End instruction is executed and the CPU is not in the transactional execution mode.

Storage-Key Alteration

In accordance with an aspect of the present invention, a storage key alteration event occurs whenever a CPU updates, e.g., the ACC or F bits of a storage key, without an access exception, associated with a 4K-byte block of storage within the storage area designated by control registers 10 and 11. Alteration of the R or C bits does not cause this event unless it also alters the ACC or F bits. Updating of the ACC or F bits is considered alteration for PER purposes even if the new value is the same as the original value, in one example.

In other embodiments, a storage key alteration event occurs when a CPU updates, e.g., the ACC or F fields of a storage key (regardless of access exception) associated with a 4K-byte block of storage (regardless of the designated storage area). Other variations are also possible.

As an example, four instructions can cause a storage key alteration event if the 4K-byte block associated with the updated storage key lies within the designated area (or in another embodiment, a designated area is not specified):

Any execution of Set Storage Key Extended. When the conditional SSKE facility is installed, either or both the MR and MC bits are one, and the access-control and fetch-protection bits are not required to be updated, then it is model-dependent if this is considered to be a storage key alteration event. In cases that the access-control and fetch-protection bits are updated, a storage key alteration event occurs, e.g., as long as the associated 4K-byte block of storage lies within the designated area.

Perform Frame Management Function when SK (bit 46 of general register R₁) is one. When the conditional-SSKE facility is installed, the handling when either the MR or MC bits is non-zero, is the same as described above for Set Storage Key Extended instruction.

Move Page when the Move Page and Set Key facility is installed and key function control (KFC) (bits 51-53 of general register 0) contains a value of 4 or 5.

Any execution of Test Block, but, in one example, only when the model's implementation actually updates the storage key.

A storage key alteration event causes a PER storage key alteration event to be recognized if, e.g., bit 35 of the PER event mask is one and the PER mask in the PSW is one.

A PER storage key alteration event is indicated by setting bit 3 of the PER code to one.

Indication of PER Events Concurrently with Other Interruption Conditions

When a PER instruction-fetching nullification event is reported, no other PER events and no other program interruption conditions are reported.

As one example, the following rules govern the indication of PER basic events caused by an instruction that also causes a program exception, a monitor event, a space-switch event, or a supervisor-call interruption.

1. The indication of an instruction-fetching basic event does not depend on whether the execution of the instruction was completed, terminated, suppressed, or nullified. However, examples of special cases of suppression and nullification are as follows:

a. When the instruction is designated by an odd instruction address in the PSW, the instruction-fetching event is not indicated.

b. When an access exception applies to the first, second, or third halfword of the instruction designated by the PSW instruction address, and the PER-3 facility is installed, the instruction-fetching event is not indicated. However, if the PER-3 facility is not installed, it is unpredictable whether the instruction-fetching event is indicated.

c. When either (a) an access exception applies to the first, second, or third halfword of the target location of an execute-type instruction, or (b) the target address of Execute is odd the following applies, in one example: if the PER-3 facility is installed, then an instruction-fetching event is not indicated for the target location; it is unpredictable whether an instruction fetching event is indicated for the execute-type instruction, including the case where the PER address range includes both the execute-type instruction and its target. If the PER-3 facility is not installed, it is unpredictable whether the instruction-fetching event is indicated for either the execute-type instruction or the target location.

2. When the operation is completed or partially completed, the event is indicated, regardless of whether any program exception, space-switch event, or monitor event is also recognized.

3. Successful-branching, zero-address detection; storage alteration, and store using real address are not indicated for an operation or, in case in the instruction is interruptible, for a unit of operation that is suppressed or nullified.

4. When the execution of the instruction is terminated, storage alteration or zero-address detection is indicated whenever the event has occurred. A model may indicate the event if the event would have occurred had the execution of the instruction been completed, even if altering the contents of the result field is contingent on operand values. For purposes of this definition, the occurrence of those exceptions which permit termination (addressing, protection, and data) is considered to cause termination, even if no result area is changed.

5. When Load PSW, Load PSW Extended, Program Return, Set System Mask, Store Then Or System Mask, or Supervisor Call causes a PER basic condition and at the same time introduces a new PSW with the type of PSW-format error that is recognized immediately after the PSW becomes active, the interruption code identifies both the PER basic condition and the specification exception.

6. When Load PSW, Load PSW Extended, Program Return, or Supervisor Call causes a PER condition and at the same time introduces a new PSW with the type of PSW-format error that is recognized as part of the execution of the following instruction, the introduced PSW is stored as the old PSW without the following instruction being fetched or executed and without the specification exception being recognized.

7. When an outermost Transaction Begin instruction causes a PER basic event and a concurrent program exception, the event suppression control does not apply.

When a PER event occurs while the CPU is in the transactional-execution mode, the transaction is aborted.

Example programming notes include, for instance:

1. The execution of the interruptible instructions Compare And Form Codeword, Compare Logical Long, Compare Until Substring Equal, Compression Call, Move Long, Test Block, and Update Tree can cause events for instruction fetching and zero-address detection. The execution of the interruptible instructions Perform Frame Management Function (when the enhanced-DAT facility is installed, and the frame-sized code designates a 1M-byte frame), Set Storage Key Extended (when the enhanced-DAT facility is installed, and the multiple-block control is one) and Test Block can cause events for instruction-fetching. Execution of Compression Call, Move Long, and Update Tree can cause events for instruction-fetching and storage-alteration.

Interruption of such an instruction may cause a PER basic event to be indicated more than once. Therefore, a program may, in one example, remove the redundant event indications from the PER data. The following rules govern the indication of the applicable events during execution of these instructions, in one example:

a. The instruction-fetching basic event is indicated, e.g., whenever the instruction is fetched for execution, regardless of whether it is the initial execution or a resumption, except that the event may be discarded (not indicated) if it is the only PER event to be indicated, the interruption is due to an asynchronous interruption condition or the performance of the stop function, and a unit of operation of the instruction remains to be executed.

b. The storage-alteration event is indicated only when data has been stored in the designated storage area by the portion of the operation starting with the last initiation and ending with the last byte transferred before the interruption. No special indication is provided on premature interruptions as to whether the event will occur again upon the resumption of the operation. When the designated storage area is a single byte location, a storage-alteration event can be recognized only once in the execution of Move Long or Compression Call, but could be recognized more than once for the Update Tree.

2. The following is one example of an outline of the general action a program is to take to delete multiple entries for PER basic events in the PER data for an interruptible instruction so that only one entry for each complete execution of the instruction is obtained:

a. Check to see if the PER address is equal to the instruction address in the old PSW and if the last instruction executed was interruptible.

b. If both conditions are met, delete instruction-fetching events.

c. If both conditions are met and the event is storage alteration, delete the event if some part of the remaining destination operand is within the designated storage area.

3. An example of the indication of a PER instruction fetching basic event caused by either a Load PSW (or Load PSW Extended) instruction or the following instruction, in connection with an entry PSW-format error or odd instruction address introduced by the Load PSW instruction.

Although one embodiment of the PER facility is described herein, other embodiments are possible. Further, other facilities or capabilities may be use to provide one or more aspects of the present invention. Many changes and variations may be made.

One or more aspects of the present invention are inextricably tied to computer technology and facilitate processing within a computer, improving performance thereof. The detection of storage key alteration events enables the detection of an incorrect program changing storage keys and/or corrupt storage keys improving security of memory and processing within the computing environment. Performance is also improved by facilitating detection of programming errors and correcting errant programs without a need to execute many instructions to determine the corrupt storage key.

Further details of one embodiment of facilitating processing within a computing environment, as it relates to one or more aspects of the present invention, are described with reference to FIGS. 6A-6B. In one example, hardware and/or firmware of a processor are used to perform the processing described below.

Referring to FIG. 6A, in one embodiment, a determination is made as to whether a storage key alteration event has occurred within a processor of a computing environment (600). The determining includes checking whether one or more selected fields of a storage key have been updated (602). The storage key is associated with a block of memory and controls access to the block of memory (604). The storage key alteration event has occurred, in one example, based on the checking indicating that the one or more selected fields of the storage key have been updated (606).

Based on determining the storage key alteration event has occurred, notification of the storage key alteration event is provided (608).

As one example, the providing notification includes providing notification of the storage key alteration event via an interrupt, based on determining the storage key alteration event has occurred (609).

In one example, the checking includes checking whether one or more selected fields of the storage key have been updated without an access exception (610). Based on the checking indicating that the one or more selected fields of the storage key have been updated without an access exception, the storage key alteration event has occurred (612).

In one example, the determining whether the storage key alteration event has occurred further includes determining whether the block of memory is within a designated storage area (614). Based on the checking indicating that the one or more selected fields of the storage key have been updated and the block of memory is within the designated storage area, the storage key alteration event has occurred (616).

Further, in one example, with reference to FIG. 6B, the checking includes checking whether one or more selected fields of the storage key have been updated without an access exception (620), and the storage key alteration event has occurred based on the checking indicating that the one or more selected fields of the storage key have been updated without an access exception and that the block of memory is within the designated storage area (622).

As an example, the designated storage area is defined by a starting address of memory designated in a first location and an ending address of memory designated in a second location (624). The first location is, for instance, a selected control register and the second location is another selected control register (626).

In one example, the ending address wraps around to the starting address, and a selected number of low order bits for the starting address and for the ending address are used in the definition of the designated storage area to include more than a single block of memory (628). Further, in one example, the determining whether the block of memory is within the designated storage area includes determining whether one or more units of memory of the block of memory lie within the designated storage area (630).

As examples, the one or more selected fields include an access-control field of the storage key (632) and/or a fetch-protection field of the storage key (634).

Other variations and embodiments are possible.

Figure 7A:
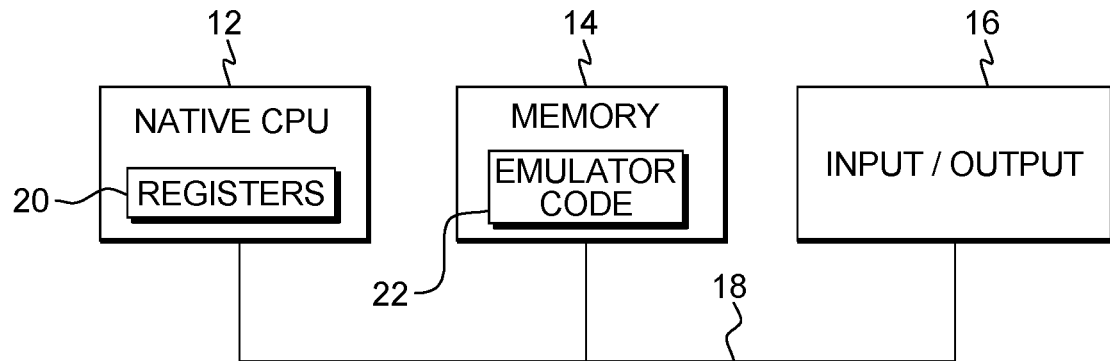
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, PR/SM and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
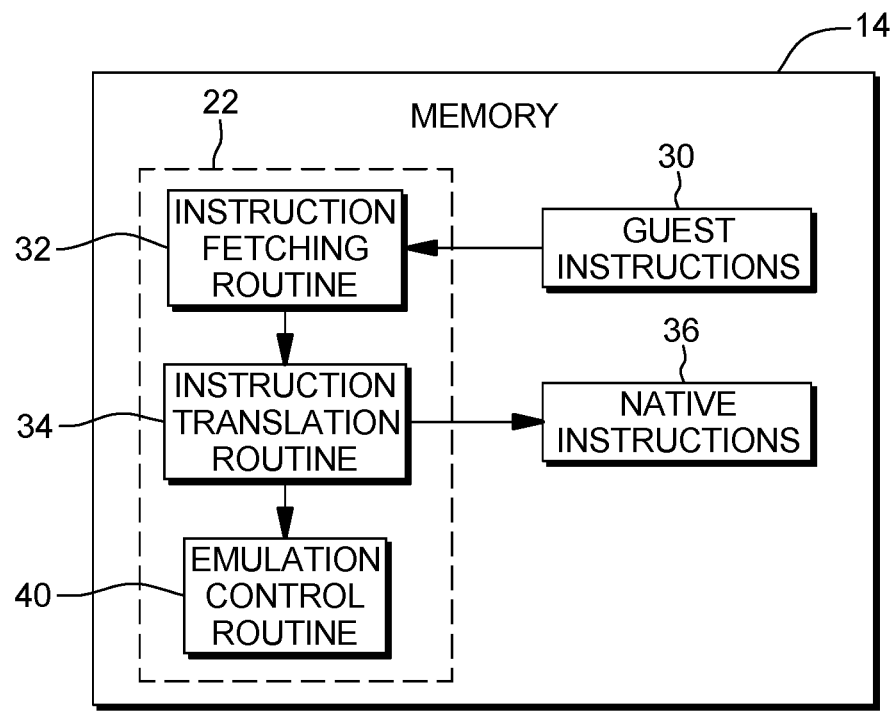
FIG. 7B depicts further details of the memory of FIG. 7A.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment.

Each computing environment is capable of being configured to include one or more aspects of the present invention. For instance, each may be configured to perform storage key alteration detection processing, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
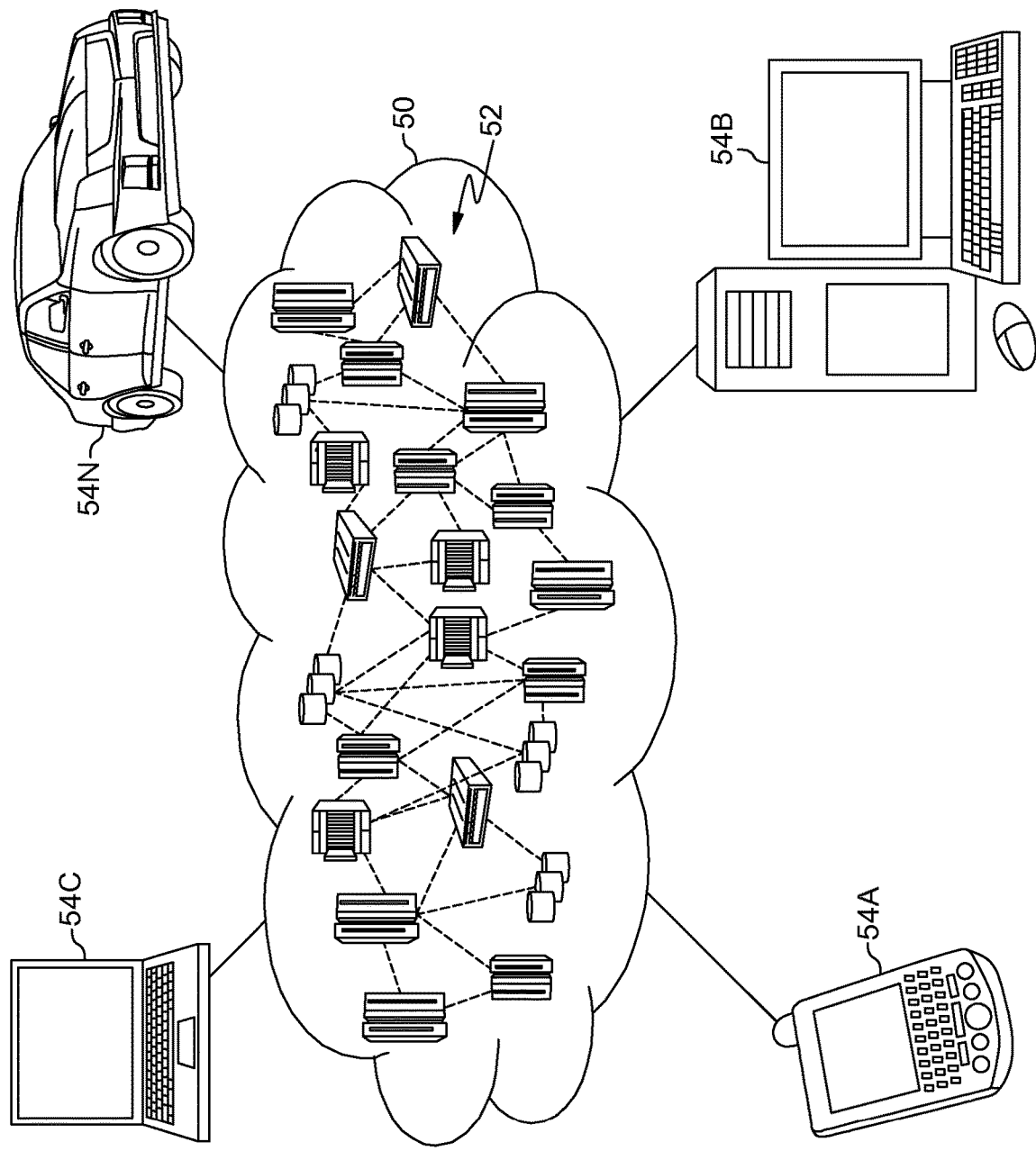
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
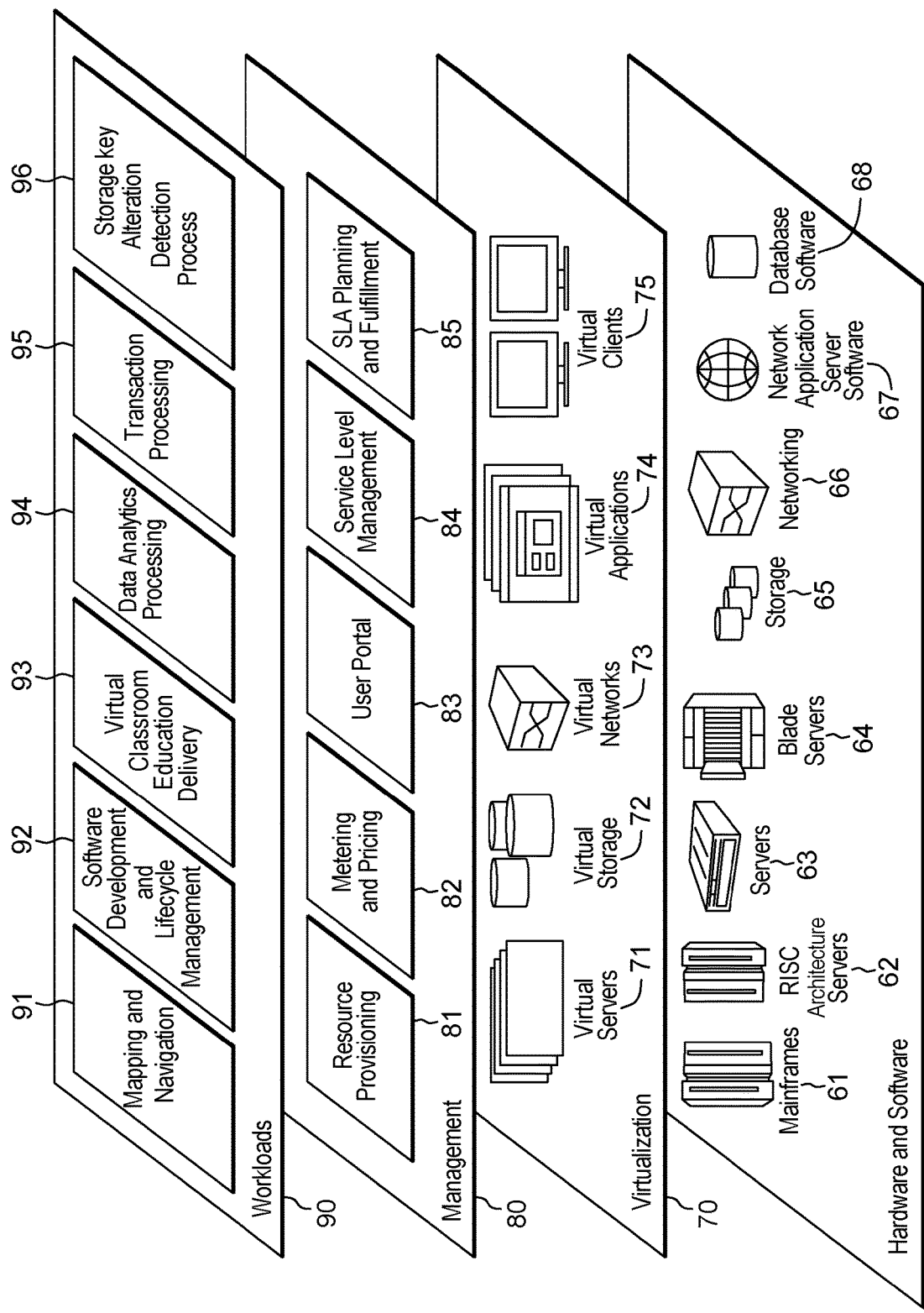
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage key alteration detection processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different facilities may be used to detect storage key alterations. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
a computer readable storage medium readable by a processing circuit and storing instructions for performing a method comprising:
determining whether a storage key alteration event has occurred within a processor of the computing environment, the determining comprising checking whether one or more selected fields of a storage key have been updated without an access exception, the storage key being associated with a block of memory and controlling access to the block of memory, wherein the storage key alteration event has occurred based on the checking indicating that the one or more selected fields of the storage key have been updated without an access exception; and
providing notification of the storage key alteration event, based on determining the storage key alteration event has occurred.

2. The computer program product of claim 1, wherein the providing notification includes providing notification of the storage key alteration event via an interrupt, based on determining the storage key alteration event has occurred.

3. The computer program product of claim 1, wherein the determining whether the storage key alteration event has occurred further comprises determining whether the block of memory is within a designated storage area, wherein the storage key alteration event has occurred based on the checking indicating that the one or more selected fields of the storage key have been updated without an access exception and that the block of memory is within the designated storage area.

4. The computer program product of claim 3, wherein the designated storage area is defined by a starting address of memory designated in a first location and an ending address of memory designated in a second location.

5. The computer program product of claim 4, wherein the first location is a selected control register and the second location is another selected control register.

6. The computer program product of claim 4, wherein the ending address wraps around to the starting address, and wherein a selected number of low order bits for the starting address and for the ending address are used in defining the designated storage area to include more than a single block of memory.

7. The computer program product of claim 3, wherein the determining whether the block of memory is within the designated storage area includes determining whether one or more units of memory of the block of memory lie within the designated storage area.

8. The computer program product of claim 1, wherein the one or more selected fields include an access-control field of the storage key.

9. The computer program product of claim 1, wherein the one or more selected fields include a fetch-protection field of the storage key.

10. A computer system for facilitating processing within a computing environment, the computer system comprising:
a memory; and
a processor coupled to the memory, wherein the computer system is configured to perform a method comprising:
determining whether a storage key alteration event has occurred within the processor of the computing environment, the determining comprising checking whether one or more selected fields of a storage key have been updated without an access exception, the storage key being associated with a block of memory and controlling access to the block of memory, wherein the storage key alteration event has occurred based on the checking indicating that the one or more selected fields of the storage key have been updated without an access exception; and
providing notification of the storage key alteration event, based on determining the storage key alteration event has occurred.

11. The computer system of claim 10, wherein the determining whether the storage key alteration event has occurred further comprises determining whether the block of memory is within a designated storage area, wherein the storage key alteration event has occurred based on the checking indicating that the one or more selected fields of the storage key have been updated without an access exception and that the block of memory is within the designated storage area.

12. The computer system of claim 11, wherein the designated storage area is defined by a starting address of memory designated in a first location and an ending address of memory designated in a second location.

13. The computer system of claim 10, wherein the one or more selected fields include an access-control field of the storage key.

14. The computer system of claim 10, wherein the one or more selected fields include a fetch-protection field of the storage key.

15. The computer system of claim 10, wherein the providing notification includes providing notification of the storage key alteration event via an interrupt, based on determining the storage key alteration event has occurred.

16. A computer-implemented method of facilitating processing within a computing environment, the computer-implemented method comprising:
   determining whether a storage key alteration event has occurred within a processor of the computing environment, the determining comprising checking whether one or more selected fields of a storage key have been updated without an access exception, the storage key being associated with a block of memory and controlling access to the block of memory, wherein the storage key alteration event has occurred based on the checking indicating that the one or more selected fields of the storage key have been updated without an access exception; and
   providing notification of the storage key alteration event, based on determining the storage key alteration event has occurred.

17. The computer-implemented method of claim 16, wherein the determining whether the storage key alteration event has occurred further comprises determining whether the block of memory is within a designated storage area, wherein the storage key alteration event has occurred based on the checking indicating that the one or more selected fields of the storage key have been updated without an access exception and that block of memory is within the designated storage area.

18. The computer-implemented method of claim 16, wherein the providing notification includes providing notification of the storage key alteration event via an interrupt, based on determining the storage key alteration event has occurred.

19. The computer-implemented method of claim 16, wherein the one or more selected fields include an access-control field of the storage key.

20. The computer-implemented method of claim 16, wherein the one or more selected fields include a fetch-protection field of the storage key.

* * * * *